«12» United States Patent
Robinson

(10) Patent No.: US 6,424,990 B1
(45) Date of Patent: Jul. 23, 2002

(54) DISTRIBUTED PROCESSING SYSTEMS INCORPORATING A PLURALITY OF CELLS WHICH PROCESS INFORMATION IN RESPONSE TO SINGLE EVENTS

(76) Inventor: Jeffrey I. Robinson, 37 Eastview Dr., New Fairfield, CT (US) 06812

( * ) Notice: Subject to any disclaimer, the term of this patent is extended or adjusted under 35 U.S.C. 154(b) by 10 days.

(21) Appl. No.: 09/667,443

(22) Filed: Sep. 22, 2000

Related U.S. Application Data

(63) Continuation-in-part of application No. 09/226,867, filed on Jan. 7, 1999, now Pat. No. 6,272,524.
(60) Provisional application No. 60/155,712, filed on Sep. 24, 1999.

(51) Int. Cl.$^7$ ................................................ G06F 15/16
(52) U.S. Cl. ...................... 709/201; 709/203; 709/208; 370/352
(58) Field of Search ................................. 709/201, 203, 709/208; 370/352

(56) References Cited

U.S. PATENT DOCUMENTS

| | | |
|---|---|---|
| 4,791,550 A | 12/1988 | Stevenson et al. |
| 5,005,122 A | 4/1991 | Griffin et al. |
| 5,036,459 A | 7/1991 | den Haan et al. |
| 5,095,522 A | 3/1992 | Fujita et al. |
| 5,165,018 A | 11/1992 | Simor |
| 5,241,673 A | 8/1993 | Schelvis |
| 5,398,336 A | 3/1995 | Tantry et al. |
| 5,430,850 A | 7/1995 | Papadopoulos |
| 5,550,976 A | 8/1996 | Henderson et al. |
| 5,790,788 A | 8/1998 | Badovinatz |
| 5,920,691 A | 7/1999 | Tsutsui et al. |
| 5,999,712 A | 12/1999 | Moiin et al. |
| 5,999,964 A | 12/1999 | Murakata et al. ............ 709/201 |
| 6,047,310 A | 4/2000 | Kamakura et al. ........... 709/201 |
| 6,047,311 A | 4/2000 | Ueno et al. .................. 709/202 |
| 6,055,363 A | 4/2000 | Beals et al. |

*Primary Examiner*—Krisna Lim
(74) *Attorney, Agent, or Firm*—David P Gordon; David S Jacobson; Thomas A Gallagher

(57) ABSTRACT

A distributed processing system includes a plurality of cells where each cell processes information in response to a type of event, and cells communicate with each other according to an (asynchronous) event-reaction protocol. Cells maintain mailing lists which are associated with events and which indicate the address(es) of cell(s) to whom a message is sent in response to the event. According to one embodiment, at least one cell is provided with the ability to read, write, and delete any address on any mailing list in the system. According to another embodiment, at least one cell keeps a list of events (subscription list) that are deemed important by the user where it is the cell's responsibility to insure that it remains subscribed to the mailing lists associated with these events. According to another embodiment, at least one cell serves more than one mailing list and preferably keeps a list of the mailing lists it serves. This cell also has the ability to move subscribers from one mailing list to another, to modify which mailing list is the currently active mailing list or to make a plurality of mailing lists simultaneously active. According to another embodiment, at least one cell has the ability to modify the subscription list of another cell. The invention is illustrated by example with reference to a PBX system.

37 Claims, 4 Drawing Sheets

Microfiche Appendix Included
(12 Microfiche, 568 Pages)

DISTRIBUTED PROCESSING SYSTEMS INCORPORATING A PLURALITY OF CELLS WHICH PROCESS INFORMATION IN RESPONSE TO SINGLE EVENTS

This application is a continuation-in-part of Ser. No. 09/226,867, filed Jan. 7, 1999, now issued as U.S. Pat. No. 6,272,524 and entitled "Distributed Processing Systems Incorporating A Plurality Of Cells Which Process Information In Response To Single Events", the complete disclosure of which is incorporated by reference herein. This application also claims the benefit of provisional application Ser. No. 60/155,712, filed Sep. 24, 1999.

BACKGROUND OF THE INVENTION

1. Field of the Invention

The invention relates to distributed processing systems. More particularly, the invention relates to distributed processing systems which incorporate a plurality of processing zones (referred to herein as "cells"), each cell processing information in response to a type of event, and each cell communicating with other cells according to an event-reaction protocol as well as according to other protocols such as streaming, broadcast, etc. Cells exhibit a symmetrical and reciprocal relationship, with cells sometimes being a controller of other cells and sometimes being controlled by other cells. The system is self-configuring, self-repairing, and operates in real time.

2. State of the Art

The above referenced parent application disclosed a distributed processing system having a plurality of cells where each cell processes information in response to a type of event, and cells communicate with each other according to a variety of protocols including an (asynchronous) event-reaction protocol. Processing is truly distributed in that no cell is considered the system host or system controller. The cells exhibit a symmetrical and reciprocal relationship with cells sometimes being a controller of other cells and sometimes being controlled by other cells.

According to one embodiment, each cell is responsive to a single event and includes one or more scripts which are executed upon the occurrence of the event. At least some scripts include directions to send information to one or more scripts in another cell.

According to another embodiment, information exchanged between cells is categorized into the following types which are listed in descending order of priority: streams, data events, data event acks, spawn process, spawn process begun, spawn process ended, exception, and broadcast.

The cells may communicate with each other via a shared memory or via a communications bus. A scalable bandwidth bus is an ideal communications path. However, the communications protocol utilized by the cells enables the use of virtually any networking medium. Thus, cells may reside in the same chip or may be separated from each other by thousands of miles. A collection of interacting cells is referred to as a colony, regardless of where the cells are located, and a collection of cells which are closely located, e.g. on the same board, are referred to as a node. The modularity and scalability of the processing systems is therefore based on collections of cells and collections of colonies. Each cell may be embodied in hardware, software, or a combination of hardware and software. No cell or colony need be considered a "host".

Each cell is provided with a collection of synchronous (non-colliding) scripts which respond to a single type of event. All scripts have addresses and the addresses of all of the scripts in the processing system are kept in a database by a resource manager script in each cell. Applications are created by linking available scripts via their respective addresses. As all scripts are driven by particular events, the code written for the distributed processing system does not require any explicit scheduling. The processing system is essentially self-scheduling and real time applications can run concurrently without interfering with each other.

Scripts communicate with each other by dynamically compiling and tearing down mailing lists which are based on the occurrence of specific events. Thus, in response to one specific event, a responding script will communicate with one set of other scripts; whereas in response to a different event, the responding script will communicate with a different set of other scripts. Scripts subscribe to and unsubscribe from the mailing lists of other scripts based on the occurrence of different events.

Cells advertise their presence in the network when connected, and periodically thereafter, in order that other cells be able to take advantage of their resources. In particular, each cell periodically (e.g. every second) updates its database of script addresses which represent the functionality of the system to accommodate the addition of new cells to the system and to accommodate for cells which have become disconnected from the system or which have stopped functioning for some reason. Thus, a processing system is readily expanded to include new and additional processing resources which are substantially automatically assimilated into the system. The processing system is, in this sense, self-configuring and self-repairing.

Communication among cells is effected with the aid of mailing lists such that data may be multicast from one cell to many cells. Moreover, the mailing lists are preferably dynamically set up and torn down depending on the execution of scripts which direct the flow of data throughout the system. Further, the mailing lists are updated as new cells are added to and old cells are removed from the system as part of the self-configuring and self-repairing functionality of the system.

An exemplary embodiment of a distributed processing system was illustrated with reference to a telephone private branch exchange PBX) in which cells are distributed over "line cards" and "phone cards" which couple several telephone sets to one or more telephone subscriber lines. In this example, the cells communicate with each other via the same physical medium through which the telephones are coupled to subscriber lines. Each line card and phone card is considered a node, each having a number of cells. Cells in the phone cards include, for example, cells responding to the following events: phone off hook, DTMF tone dialed, ring detected, etc. Examples of scripts executed in response to events include, generate dial tone, send ringing signal, seize subscriber line, etc. Each of the cards advertises its presence to the other cards on a regular basis. The knowledge of the presence of cards (nodes) in the system is used to build mailing lists when, for example, a conference call is made, or when the system is programmed so that only some phones in the system ring when an outside call is detected by a line card.

SUMMARY OF THE INVENTION

Subsequent development of the exemplary PBX system has led to the invention of several new features which can be used to provide the PBX with additional functionality and which can be used in any of the distributed processing systems according to the invention. Those skilled in the art will appreciate how these new features operate by comparing the source code of the Microfiche Appendix of this application with the source code of the Appendix of the previous application.

One of the important new features of the invention is that at least one cell is provided with the ability to read, write, and delete any address on any mailing list in the system.

Another new feature of the invention is that at least one cell keeps a list of events that are deemed important by the user where it is the cell's responsibility to insure that it remains subscribed to the mailing lists associated with these events. For easy reference, this list is referred to as "the subscription list".

Yet another new feature of the invention is that at least one cell serves more than one mailing list and preferably keeps a list of the mailing lists it serves. This cell also has the ability to move subscribers from one mailing list to another, to modify which mailing list is the currently active mailing list or to make a plurality of mailing lists simultaneously active.

Still another important new feature of the invention is that at least one cell has the ability to modify the subscription list of another cell.

As described in more detail below with reference to the figures and the source code, these additional new features can be understood with regard to how they improve the functionality of the exemplary PBX system. For example, each phone card in the system will keep a subscription list (programmed by a human during system setup) of the line card mailing lists to which it is subscribed. This improves the self-healing and self-configuring aspects of the invention. In the PBX example of the prior application, each phone card attempted to subscribe to each line card and repeatedly attempted to join the mailing list of each line card. Most often, the line cards ignored the attempt to join as being redundant. In the case of a system failure, however, the repeated attempts to join line card mailing lists served a self-healing function. According to the new features of the invention, each phone card keeps a list of all of the line cards to which it has incoming access (the line card mailing lists to which it is subscribed) and a list of the line cards to which it has outgoing access. During periodic self-healing, the phone cards read the line card mailing lists to assure that they are still subscribed to the correct line cards. If they find that a line card mailing list which is indicated on their subscription list dose not list them as a subscriber, they re-subscribe to that list. When a phone goes off hook to make a call, the phone card runs down the list of line cards to which it has outgoing access until it finds a line card which is not in use. If all line cards are in use, the phone card will notify the user.

The feature of being able to read, write and delete any mailing list in the system coupled with the feature of being able to modify any subscription list in the system enable powerful self-configuring in which entirely new functionality can be automatically added to the system. For example, in the exemplary PBX system, a new call assistant card can be created which automatically intervenes between one or more line cards and one or more phone cards. The call assistant card can be configured to answer incoming calls and redirect them to particular phone cards in response to DTMF tones entered by the caller and can act as a phone directory and voicemail system. The call assistant card has the ability to read, write and delete the mailing lists on the line cards and also has the ability to read, write and delete the subscription lists of the phone cards. Thus, the call assistant card will, if directed to do so at the time it is added to the system, take a copy of the mailing lists of one or more line cards and substitute itself as the only subscriber to those line cards. It will also delete the appropriate line card addresses from one or more of the phone card incoming line subscription lists and substitute its address for the line card address. By doing this, the phone cards are automatically subscribed to the new call assistant and are automatically programmed to self-heal by re-subscribing to the call assistant rather than to the line cards.

The line cards are automatically reprogrammed to direct calls to the call assistant and the call assistant will automatically re-subscribe to the line cards when needed to self-heal.

The new feature of maintaining multiple mailing lists coupled with the feature of maintaining a list of the mailing lists enables new enhanced interworking among cells which was previously not readily enabled. For example, if a phone card is provided with two mailing lists for speech streams, call waiting is readily enabled. The first call or group of calls is placed on the first mailing list. A call waiting call or group of calls is placed on the second mailing list. Flashing the switch hook toggles from the first mailing list to the second mailing list. This effects a move from the first call or group of calls to the second call or group of calls. An option can be provided to make both mailing lists active at the same time and thereby merge the two groups. Multiple mailing lists in a phone card can enable many "voice channels" so that a number of calls or call groups can be handled simultaneously.

Additional objects and advantages of the invention will become apparent to those skilled in the art upon reference to the detailed description taken in conjunction with the provided figures.

BRIEF DESCRIPTION OF THE APPENDIX

The Microfiche Appendix, 12 sheets of 568 frames, includes source code listing for implementing an exemplary PBX utilizing a distributed processing system according to the invention. (464 pages)

DETAILED DESCRIPTION OF THE DRAWINGS

As mentioned above, one of the new features of the distributed processing systems of the invention is that a cell keep a list of the events or mailing lists to which it is subscribed (a "subscription list") and uses this list periodically to effect "self-healing". This feature is illustrated with reference to the phone cards of the PBX system example.

Figure 1:
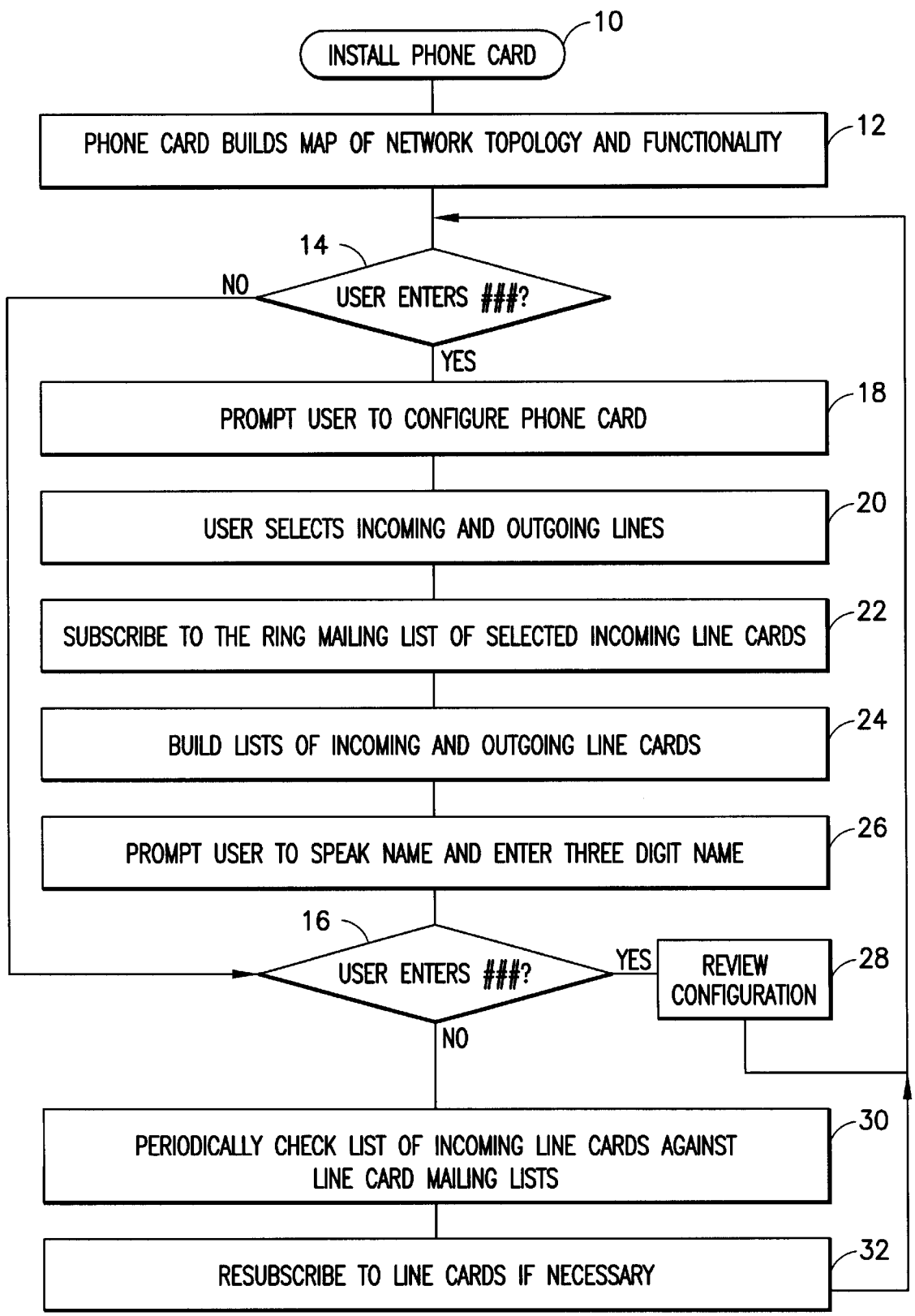
FIG. 1 is a simplified flow chart of the installation and configuration of a phone card embodying many of the new features of the invention.

Turning now to FIG. 1, according to the presently preferred embodiment of the PBX system example, when a phone card is added to the system, it must be configured by the user. As shown in FIG. 1, after the phone card is installed at 10, the card automatically builds a map of the network topology and functionality at 12 by listening to the periodic advertisements of the other cards connected to the network. See Microfiche Appendix page 74, NICRX.C. At this point, the card is ready to receive instructions for configuration and waits at 14 and 16 for the user to enter the command ## or ### via a telephone attached to the card. If the user enters ###, the phone card prompts the user to configure the card at 18. For example, according to the preferred embodiment, the card sends an audio message to the phone stating which incoming lines are available and prompts the user to select which incoming lines should ring this phone and which lines should be available to this phone for making outside calls. At 20 the user selects, using the DTMF keypad on the phone which lines will be incoming and which will be outgoing. See Microfiche Appendix page 152, PH_CONF.C.

In response to the user input, the card subscribes to the selected incoming line cards at 22. Further, at 24, the phone card makes a list of which line cards it is subscribed to for incoming ring and which line cards are available to it for making outside calls. The card then prompts the user at 26 to speak the user's name and to spell the user's name using the DTMF keypad. The digitized voice and DTMF tones are stored on the phone card for use later as described below with reference to FIG. 2. The user may review the configuration by pressing ## on the DTMF keypad of the phone attached to the card. If the card detects this at 16, the card speaks the configuration data at 28. See Microfiche Appendix page 152 et seq.

As mentioned above, the card periodically reads the mailing lists of the line cards it is subscribed to at 30 and resubscribes at 32 if necessary. The card may be reconfigured at any time by pressing ### and the configuration reviewed at any time by pressing ##.

Figure 2:
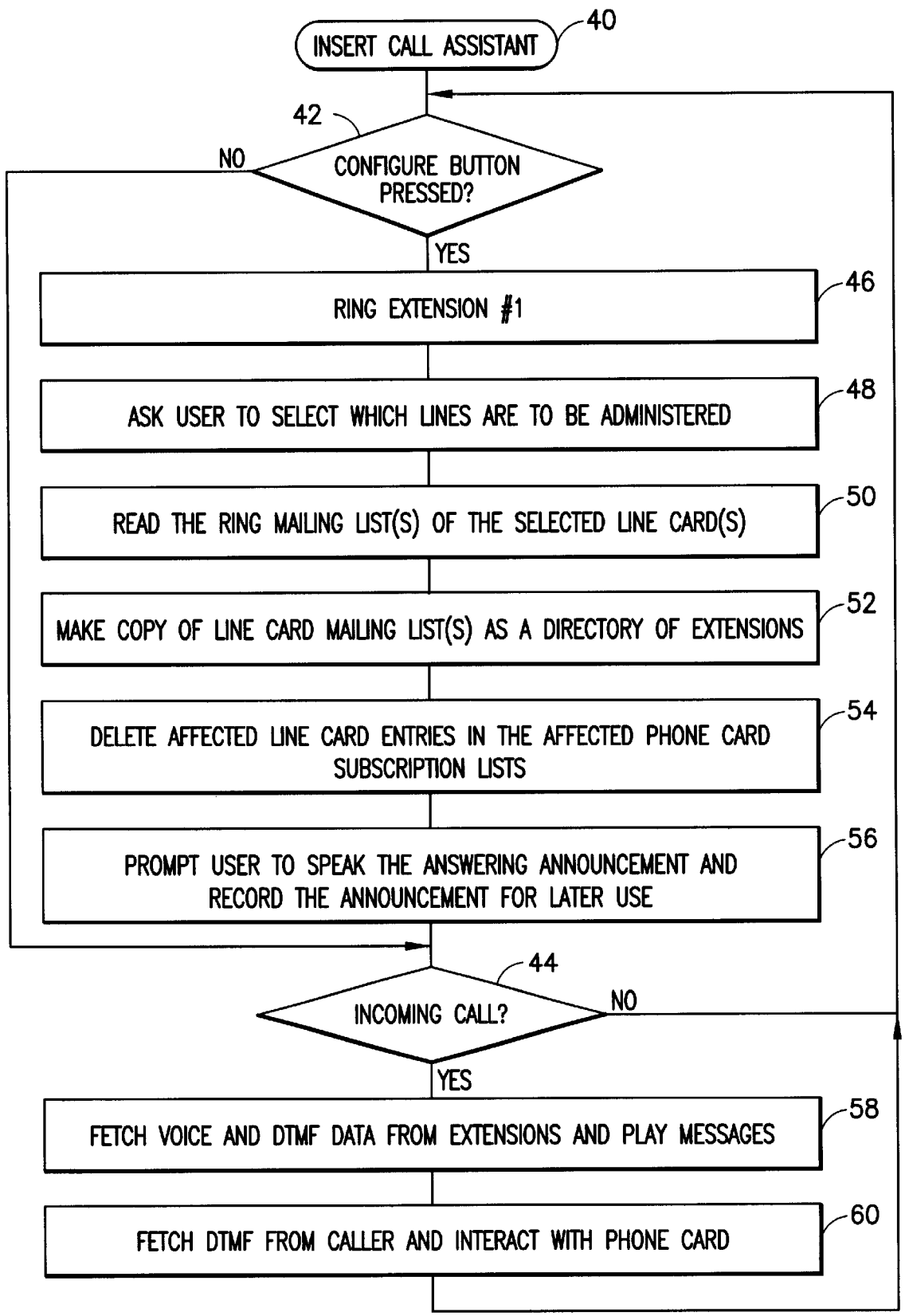
FIG. 2 is a simplified flow chart of the installation and configuration of a call assistant embodying many of the new features of the invention.

Also as mentioned above, the new feature of being able to read, write and delete any mailing list in the system coupled with the new feature of being able to modify any subscription list in the system enable powerful self-configuring in which entirely new functionality can be automatically added to the system. The new feature of being able to read, write and delete any mailing list in the system is illustrated in the Microfiche Appendix at page 376, SCRIPT.C. The new feature of being able to modify any subscription list in the system is not yet illustrated in source code. Nevertheless, after reviewing the source code in the Appendix, those skilled in the art will appreciate how this feature can be implemented. As mentioned above, in the exemplary PBX system, a new call assistant card can be created which automatically intervenes between one or more line cards and one or more phone cards. FIG. 2 illustrates how a call assistant card is configured and operates in a basic mode.

Turning now to FIG. 2, when the call assistant is installed at 40, it waits at 42 and 44 for a configuration button to be pressed or for an incoming call to be detected. If the configuration button is pressed, the call assistant sends a ring message to the first phone card in the system at 46. The phone attached to the first phone card will be used to configure the call assistant card.

When the user picks up the ringing phone, the call assistant asks the user at 48 to select which incoming lines are to be administered by the call assistant. After the user responds using the DTMF keypad, the call assistant reads the ring mailing list(s) of the selected card(s) at 50. At 52, the call assistant copies the mailing list subscribers to a directory of extensions at 52. The call assistant then, at 54, deletes subscription list entries from the phone cards in the directory of extensions so that those phone cards no longer subscribe the line cards which are now administered by the call assistant. At some point, e.g. at 56 in FIG. 2, the call assistant prompts the user to speak a welcome announcement which is recorded by the call assistant for later use.

The basic mode of operation of the call assistant is seen at 44, 58, and 60 in FIG. 2. If an incoming call is detected at 44, the call assistant fetches voice and DTMF data from the phone cards (see 26 at FIG. 1) listed in the directory of extensions and plays a message to the caller at 58. The message includes the announcement recorded at 56 and a recital of the directory of available extensions. The recital of the directory includes for example "for [play voice data] press [recite digits associated with DTMF data]" repeated for every phone card for which voice and DTMF data was fetched.

From the foregoing, it will be appreciated that the call assistant is dynamically self-configurable when users change extensions or extensions change user names. Also when new extensions are added, the call assistant can take their subscription to a line card administered by the call assistant as explained above in connection with self-healing. The call assistant will periodically check the mailing list(s) of the line(s) it is administering and perform steps 50, 52, and 54 if a new phone card is detected on a mailing list.

Figure 3:
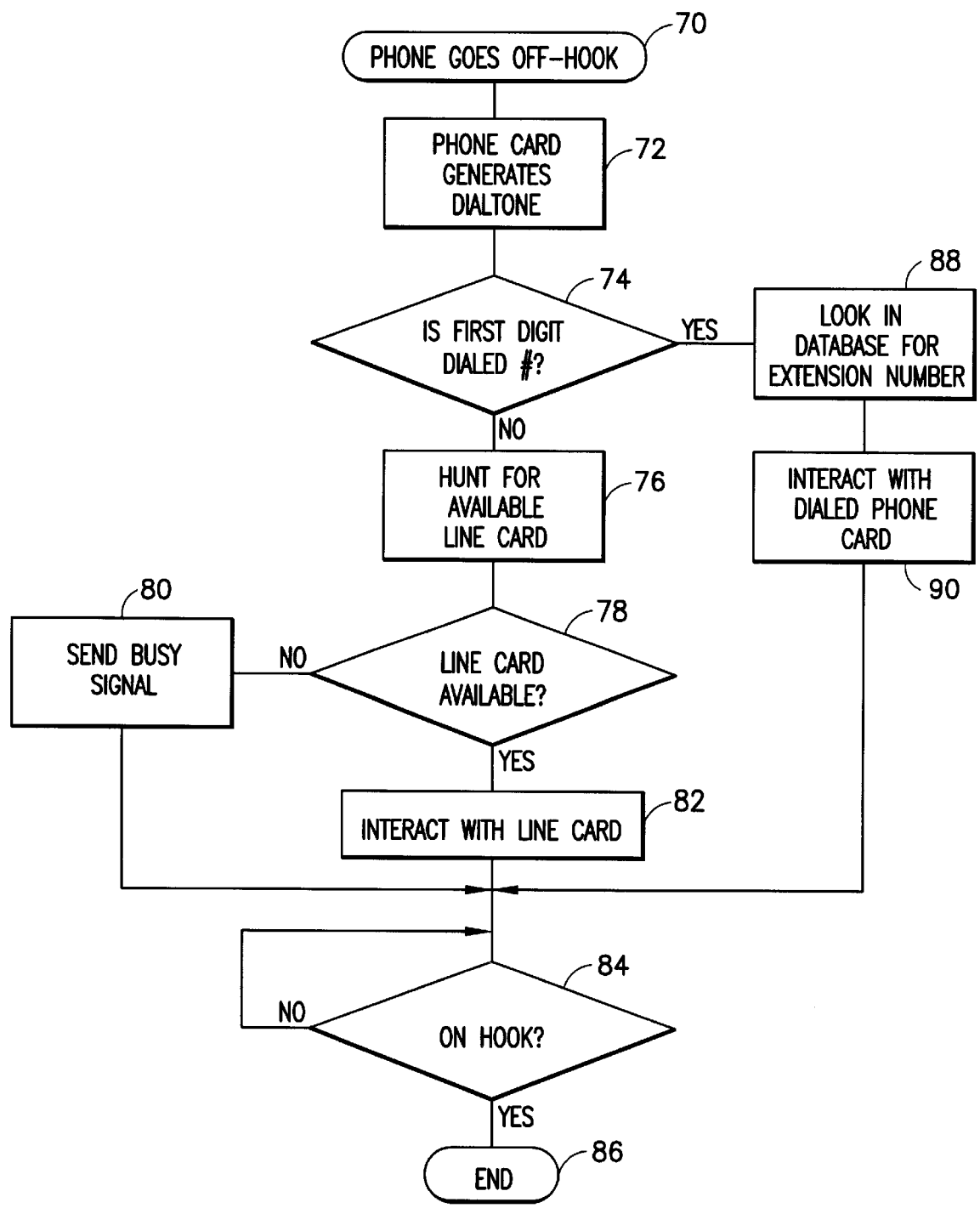
FIG. 3 is a simplified flow chart of the operation of a phone card embodying many of the new features of the invention.

The basic operation of a phone card in the improved PBX system is illustrated in FIG. 3. When a phone goes off-hook at 70, the phone card generates a dial tone at 72. If the first digit dialed is not #, as determined at 74, the phone card looks to its list of available outgoing line cards and hunts for one which is not in use at 76. See Microfiche Appendix page 252, PH_SM_GL.C. If it is determined at 78 that all the available line cards are in use, a busy signal is generated at 80. This may happen before the user completes dialing a complete phone number. If an available line card is in not in use, it is seized and interacted with at 82. In either case, busy or interaction with line card will continue until it is determined at 84 that the phone has gone on-hook, after which it will end at 86. As mentioned above, if the user dials ### or ##, configuration mode or configuration review is triggered. In addition, if a user dial #xy where $2 \leq x \leq 9$ and $2 \leq y \leq 9$, an extension matching that number is called. This is illustrated at 88 and 90 in FIG. 3. Though not illustrated, it will be appreciated that if the number dialed does not correspond to an extension number in use, a busy signal or audio message will be played to indicate so. See Microfiche Appendix page 262, PH_SM_GP.C. line card is in not in use, it is seized and interacted with at 82. In either case, busy or interaction with line card will continue until it is determined at 84 that the phone has gone on-hook, after which it will end at 86. As mentioned above, if the user dials ### or ##, configuration mode or configuration review is triggered. In addition, if a user dial #xy where $2 \leq x \leq 59$ and $2 \leq y \leq 9$, an extension matching that number is called. This is illustrated at 88 and 90 in FIG. 3. Though not illustrated, it will be appreciated that if the number dialed does not correspond to an extension number in use, a busy signal or audio message will be played to indicate so. See Appendix page 262, PH_SM_GP.C.

As mentioned above, the new feature of maintaining multiple mailing lists coupled with the feature of maintaining a list of the mailing lists enables new enhanced interworking among cells which was previously not readily enabled. For example, if a phone card is provided with two mailing lists for speech streams, call waiting is readily enabled. The first call or group of calls is placed on the first mailing list. A call waiting call or group of calls is placed on the second mailing list. Flashing the switch hook and pressing a key toggles from the first mailing list to the second mailing list. This effects a move from the first call or group of calls to the second call or group of calls. An option can be provided to make both mailing lists active at the same time and thereby merge the two groups. Multiple mailing lists in a phone card can enable many "voice channels" so that a number of calls or call groups can be handled simultaneously. As used herein a channel may contain more than one call, i.e. may be a conference call. According to the preferred embodiment, one switches channels in a manner similar to that used with call waiting, i.e. by flashing the switch hook. Table 1, below, illustrates the many features enabled by multiple mailing lists and the list of lists. As shown in Table 1, ˆ means hook flash.

TABLE 1

| ˆ Command | (syntax) Resulting Action |
|---|---|
| ˆC | (C = keypad number 2) Creates a new channel, audio prompt announces channel number. |
| ˆMX | (M = keypad number 6, X is a channel number) Attaches channel X to the presently active channel making both active. |
| ˆ*X | (* = keypad *, X is a channel number) Detaches channel X from the presently active channels |
| ˆSX | (S = keypad number 7, X is a channel number) Switches from presently active channel(s) to channel X |
| ˆW | (W = keypad number 9) accepts a call waiting call and creates a new channel for it, audio announcernent of new channel number. |
| ˆGXY | (G = keypad number 4, XY is the number of a line card) Creates a new channel and connects it to the selected line card, audio announcernent of new channel number. |
| ˆG00 | (G = keypad number 4, 00 is zero zero) Creates a new channel and connects it to the next ringing line card, audio announcement of new channel number. |
| ˆT#XY | (T = keypad number 8, # = keypad #, XY is extension number) Transfers the presently active channel(s) to extension XY. |
| ˆDX | (D = keypad number 3, X is a channel number) Drops the currently active channel(s) and makes channel X active. |
| ˆ1 | Audio announcement of new channel number. |

Figure 4:
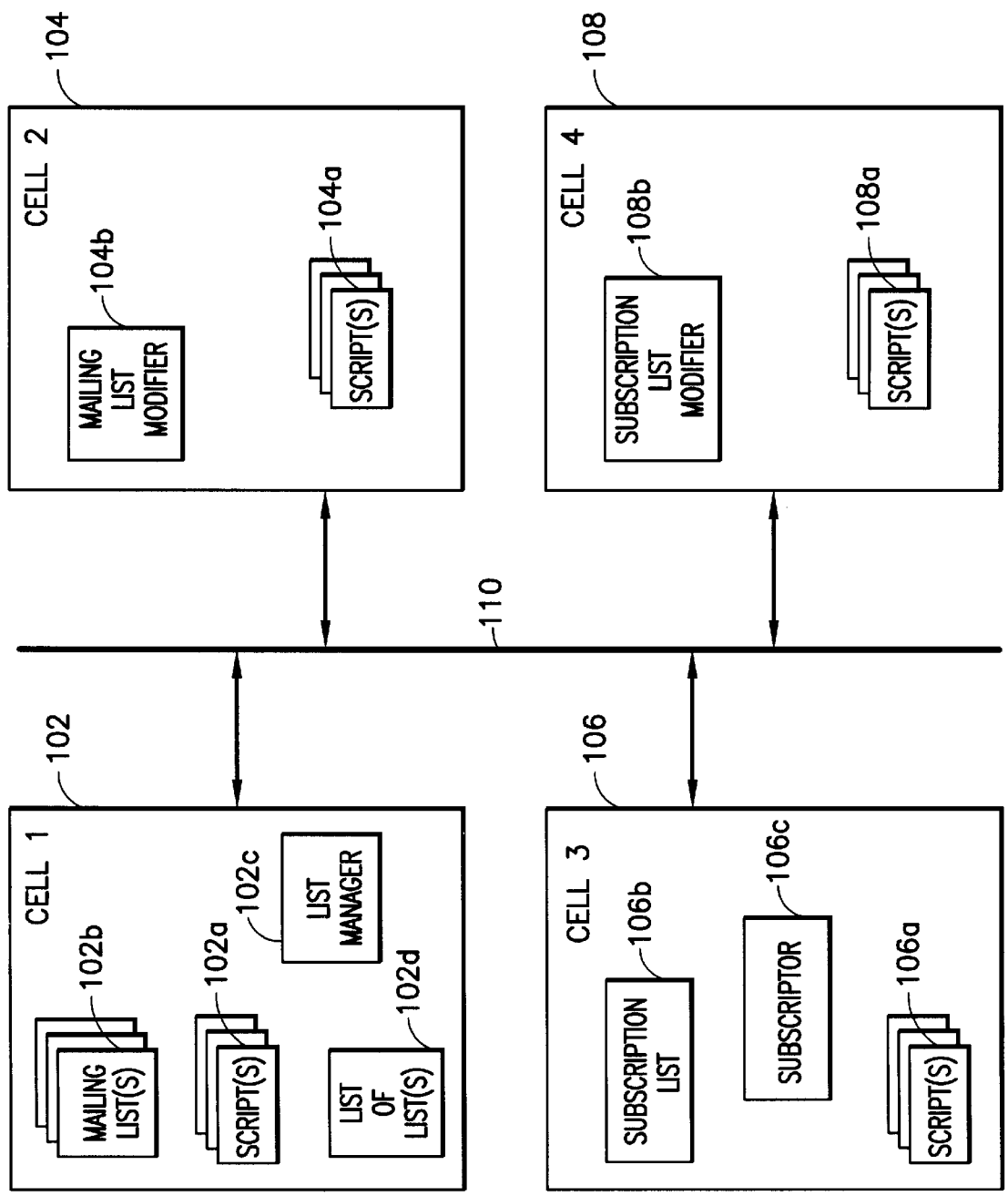
FIG. 4 is a simplified schematic diagram illustrating a distributed processing system according to the invention.

Referring now to FIG. 4, a distributed processing system incorporating feature os the invention is illustrated generally as 100. The system 100 includes a plurality of cells 102, 104, 106, 108 each of which responds to an event by executing at least one script 102a, 104a, 106a, 108a. The cells are coupled to a communications network 110 through which they may exchange messages. At least one of the cells, e.g. 102, maintains at least one mailing list 102b containing the addresses or names of subscriber cells to which the cell 102 will send one or more messages in response to an event. According to one aspect of the invention, at least one cell, e.g. 104, is provided with means 104b for modifying the mailing list(s) of another cell. According to a second aspect of the invention, at least one cell, e.g. 106, maintains a subscription list 106b which lists all of the mailing list to which the cell subscribes (or only those designated as important). The cell with the subscription list also includes a "subscriptor" means 106c for maintaining its listing on the lists in the subscription list. According to a third aspect of the invention, one of the cells, e.g. 108, includes means 108b for modifying subscription lists in other cells. According to a fourth object of the invention, one of the cells, e.g. 102, maintains a plurality of mailing lists 102b, a list manager 102c, and preferably also a list 102d of the maintaining lists 102b. The list manager 102c has the ability to move subscribers from one list to another, add new subscribers, delete subscribers, make one or more lists active while the others are inactive, and make active lists inactive.

There have been described and illustrated herein several embodiments of a distributed processing system incorporating a plurality of cells with each cell being responsive to a type of event. While particular embodiments of the invention have been described, it is not intended that the invention be limited thereto, as it is intended that the invention be as broad in scope as the art will allow and that the specification be read likewise. Thus, while particular a particular embodiment has been disclosed with reference to software, it will be appreciated that the invention may be embodied in software, hardware, or combinations of software and hardware. It will therefore be appreciated by those skilled in the art that yet other modifications could be made to the provided invention without deviating from its spirit and scope as so claimed.

What is claimed is:

1. A distributed processing system, comprising:

a plurality of cells, each cell being responsive to an event and each cell including at least one executable script which is executed upon the occurrence of the event; and a communications means coupled to each of said cells for exchanging messages between cells, wherein a first cell maintains a mailing list of at least one subscriber cell to which said first cell sends at least one message upon the execution of the at least one executable script included with said first cell; and a second cell includes means for modifying said mailing list.

2. A distributed processing system according to claim 1, wherein:

one of said at least one subscriber cell maintains a subscription list listing said mailing list and includes means for remaining listed on said mailing list.

3. A distributed processing system according to claim 2, wherein:

one of said plurality of cells other than said at least one subscriber cell includes means for modifying said subscription list.

4. A distributed processing system according to claim 1, wherein:

said first cell maintains a plurality of mailing lists, and said means for modifying said mailing list includes means for modifying at least one of said plurality of mailing lists.

5. A distributed processing system according to claim 4, wherein:

said first cell maintains a list of said plurality of mailing lists.

6. A distributed processing system according to claim 4, wherein:

said first cell includes means for moving said at least one subscriber cell from one of said plurality of mailing lists to another of said plurality of mailing lists.

7. A distributed processing system according to claim 4, wherein:

said first cell includes means for making one of said plurality of mailing lists an active mailing list.

8. A distributed processing system according to claim 4, wherein:

said first cell includes means for making more than one of said plurality of mailing lists an active mailing list.

9. A distributed processing system according to claim 1, wherein:

said system is a PBX system, said first cell is associated with a line card,
said at least one subscriber cell is associated with a phone card, and
said second cell is associated with a call assistant.

10. A distributed processing system, comprising:
a plurality of cells, each cell being responsive to an event and each cell including at least one executable script which is executed upon the occurrence of the event; and
a communications means coupled to each of said cells for exchanging messages between cells, wherein
a first cell maintains a mailing list of at least one subscriber cell to which said first cell sends at least one message upon the execution of the at least one executable script included with said first cell; and
said at least one subscriber cell maintains a subscription list listing said mailing list and includes means for remaining listed on said mailing list.

11. A distributed processing system according to claim 10, wherein:
one of said plurality of cells includes means for modifying said mailing list.

12. A distributed processing system according to claim 10, wherein;
one of said plurality of cells other than said at least one subscriber cell includes means for modifying said subscription list.

13. A distributed processing system according to claim 11, wherein:
said first cell maintains a plurality of mailing lists, and
said means for modifying said mailing list includes means for modifying at least one of said plurality of mailing lists.

14. A distributed processing system according to claim 10, wherein:
said first cell maintains a list of said plurality of mailing lists.

15. A distributed processing system according to claim 10, wherein:
said first cell includes means for moving said at least one subscriber cell from one of said plurality of mailing lists to another of said plurality of mailing lists.

16. A distributed processing system according to claim 10, wherein:
said first cell includes means for making one of said plurality of mailing lists an active mailing list.

17. A distributed processing system according to claim 10, wherein:
said first cell includes means for making more than one of said plurality of mailing lists an active mailing list.

18. A distributed processing system according to claim 10, wherein:
said system is a PBX system,
said first cell is associated with a line card, and
said at least one subscriber cell is associated with a phone.

19. A distributed processing system, comprising:
a plurality of cells, each cell being responsive to an event and each cell including at least one executable script which is executed upon the occurrence of the event; and
a communications means coupled to each of said cells for exchanging messages between cells, wherein
a first cell maintains a mailing list of at least one subscriber cell to which said first cell sends at least one message upon the execution of the at least one executable script included with said first cell;
said at least one subscriber cell maintains a subscription list listing said mailing list; and
at least one of said plurality of cells other than said at least one subscriber cell includes means for modifying said subscription list.

20. A distributed processing system according to claim 19, wherein:
a second cell includes means for modifying said mailing list.

21. A distributed processing system according to claim 19, wherein:
said at least one subscriber cell includes means for remaining listed on said mailing list.

22. A distributed processing system according to claim 20, wherein:
said first cell maintains a plurality of mailing lists, and
said means for modifying said mailing list includes means for modifying at least one of said plurality of mailing lists.

23. A distributed processing system according to claim 22, wherein:
said first cell maintains a list of said plurality of mailing lists.

24. A distributed processing system according to claim 22, wherein:
said first cell includes means for moving said at least one subscriber cell from one of said plurality of mailing lists to another of said plurality of mailing lists.

25. A distributed processing system according to claim 22, wherein:
said first cell includes means for making one of said plurality of mailing lists an active mailing list.

26. A distributed processing system according to claim 22, wherein:
said first cell includes means for making more than one of said plurality of mailing lists an active mailing list.

27. A distributed processing system according to claim 19, wherein:
said system is a PBX system,
said first cell is associated with a line card,
said at least one subscriber cell is associated with a phone card, and
said at least one of said plurality of cells other than said at least one subscriber cell is associated with a call assistant.

28. A distributed processing system, comprising:
a plurality of cells, each cell being responsive to an event and each cell including at least one executable script which is executed upon the occurrence of the event; and
a communications means coupled to each of said cells for exchanging messages between cells, wherein
a first cell maintains a plurality of mailing lists, each listing at least one subscriber cell to which said first cell can send at least one message upon the execution of the at least one executable script included with said first cell.

29. A distributed processing system according to claim 28, wherein:
a second cell includes means for modifying at least one of said mailing lists.

30. A distributed processing system according to claim 28, wherein:

one of said at least one subscriber cell maintains a subscription list listing said mailing list and includes means for remaining listed on said mailing list.

31. A distributed processing system according to claim 30, wherein:
one of said plurality of cells other than said at least one subscriber cell includes means for modifying said subscription list.

32. A distributed processing system according to claim 28, wherein:
said first cell maintains a list of said plurality of mailing lists.

33. A distributed processing system according to claim 28, wherein:
said first cell includes means for moving said at least one subscriber cell from one of said plurality of mailing lists to another of said plurality of mailing lists.

34. A distributed processing system according to claim 28, wherein:
said first cell includes means for making one of said plurality of mailing lists an active mailing list.

35. A distributed processing system according to claim 28, wherein:
said first cell includes means for making more than one of said plurality of mailing lists an active mailing list.

36. A distributed processing system according to claim 25, wherein:
said system is a PBX system,
said plurality of mailing lists includes at least one list associated with parties to phone calls,
said at least one list having at least two subscriber cells.

37. A method of distributing processes in a distributed processing system, comprising:
a) providing a plurality of processing cells, each cell being responsive to an event and each cell including at least one executable script which is executed upon the occurrence of the event, a first cell maintaining a mailing list of at least one subscriber cell to which said first cell sends at least one message upon the execution of the at least one executable script included with said first cell;
b) providing a communications means coupled to each of said cells for exchanging messages between cells;
c) a step selected from the following list
   i) providing a second cell with means for modifying said mailing list;
   ii) providing said at least one subscriber cell with a subscription list and providing another cell with means for modifying the subscription list;
   iii) providing the first cell with a plurality of mailing lists and means for making one or more of the plurality of mailing lists active; or
   iv) providing the first cell with a plurality of mailing lists and means for moving subscribers from one list to another.

* * * * *